(12) United States Patent
Klein

(10) Patent No.: US 9,408,089 B2
(45) Date of Patent: Aug. 2, 2016

(54) METHOD OF OPERATING A BASE STATION AND BASE STATION

(75) Inventor: Siegfried Klein, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/809,235

(22) PCT Filed: May 20, 2011

(86) PCT No.: PCT/EP2011/058256
§ 371 (c)(1),
(2), (4) Date: Jan. 9, 2013

(87) PCT Pub. No.: WO2012/004042
PCT Pub. Date: Jan. 12, 2012

(65) Prior Publication Data
US 2013/0115891 A1    May 9, 2013

(30) Foreign Application Priority Data
Jul. 9, 2010  (EP) .................................... 10290380

(51) Int. Cl.
| | |
|---|---|
| *H04B 17/00* | (2006.01) |
| *H04W 24/02* | (2009.01) |
| *H04W 16/28* | (2009.01) |
| *H04W 72/08* | (2009.01) |

(52) U.S. Cl.
CPC .............. *H04W 24/02* (2013.01); *H04W 16/28* (2013.01); *H04W 72/08* (2013.01)

(58) Field of Classification Search
CPC ..... H04W 16/28; H04W 24/00; H04W 24/08; H01Q 3/04; H01Q 3/08; H01Q 1/125

USPC ............ 455/562.1, 67.11, 67, 11, 67.13, 560, 455/561, 68, 69; 343/757, 880
See application file for complete search history.

(56) References Cited

U.S. PATENT DOCUMENTS

| | | | |
|---|---|---|---|
| 5,960,350 A | 9/1999 | Schorman et al. | |
| 6,104,936 A * | 8/2000 | Kronestedt | ................ 455/562.1 |
| 7,130,663 B2 | 10/2006 | Guo | |
| 8,666,451 B2 | 3/2014 | Engström et al. | |

(Continued)

FOREIGN PATENT DOCUMENTS

| | | |
|---|---|---|
| CN | 1240545 | 1/2000 |
| CN | 1874587 | 12/2006 |

(Continued)

OTHER PUBLICATIONS

International Search Report for PCT/EP2011/058256 dated Aug. 3, 2011.

(Continued)

*Primary Examiner* — Nhan Le
(74) *Attorney, Agent, or Firm* — Fay Sharpe, LLP

(57) ABSTRACT

The present invention relates to a method, of operating a base station (100) of a cellular communications network, wherein said base station (100) comprises at least one antenna (110), said method comprising a step of adjusting (200) a tilt angle ($\theta$) of the antenna (110) and/or of a beam pattern of said antenna, wherein said step of adjusting (200) is performed depending on a quality measure which characterizer the quality of a signal transmission associated with said antenna (110).

14 Claims, 2 Drawing Sheets

(56) References Cited

U.S. PATENT DOCUMENTS

| | | | | |
|---|---|---|---|---|
| 2005/0250542 | A1* | 11/2005 | Aoyama et al. | 455/562.1 |
| 2007/0021151 | A1* | 1/2007 | Mori et al. | 455/562.1 |
| 2010/0159930 | A1 | 6/2010 | Hagerman et al. | |
| 2011/0053647 | A1* | 3/2011 | Oyama | 455/562.1 |
| 2012/0083281 | A1* | 4/2012 | Watanabe | H04W 24/02 |
| | | | | 455/446 |

FOREIGN PATENT DOCUMENTS

| | | |
|---|---|---|
| EP | 1 912 454 A1 | 4/2008 |
| JP | 2004-507151 | 3/2004 |
| JP | 4242061 | 3/2009 |
| JP | 2009-522885 | 6/2009 |
| JP | 4446272 | 4/2010 |
| KR | 2004-0001840 | 1/2004 |
| WO | WO 98/25362 A1 | 6/1998 |
| WO | WO 2004/088790 | 10/2004 |
| WO | WO 2010/051838 | 5/2010 |
| WO | WO 2010/076041 | 7/2010 |

OTHER PUBLICATIONS

European Search Report dated Sep. 23, 2013.

* cited by examiner

METHOD OF OPERATING A BASE STATION AND BASE STATION

FIELD OF THE INVENTION

The invention relates to a method of operating a base station for a cellular communications network. The invention further relates to a base station for a cellular communications network.

BACKGROUND

Conventional base stations for cellular communications networks comprise antenna systems having one or more antennas which are mounted and adjusted during an installation of the base station in the field.

Particularly, a tilt angle between a main beam direction of the antenna's characteristic beam pattern and a horizontal plane is manually adjusted by service technicians during the installation. After the installation, the tilt angle remains fixed.

There is a need to provide a more sophisticated base station and method of operating a base station which offer increased flexibility regarding the operational characteristics of the base station.

SUMMARY

According to the present invention, regarding the above mentioned method of operating a base station, this object is achieved by: adjusting a tilt angle of the antenna and/or of a beam pattern of said antenna, wherein said step of adjusting is performed depending on a quality measure which characterizes the quality of a signal transmission associated with said antenna. The inventive adjustment of the tilt angle depending on said quality measure advantageously provides an additional degree of freedom for operating the base station. Thus, ongoing data transmissions with terminals served by the base station may be optimized in a real-time or at least nearly real-time fashion, i.e. the tilt angle may be modified during an ongoing data transmission to improve a quality measure characterizing the ongoing data transmission.

Particularly, according to an embodiment, the tilt angle adjustment is performed dynamically, i.e. without interrupting an ongoing data transmission via the antenna the tilt angle of which is adjusted.

Preferably, a signal to noise plus interference ratio, SINR, is used by the base station as a quality measure to assess the quality of a signal transmission. Of course, other suitable parameters such as a bit error rate, BER, may also be used to characterize the quality of a signal transmission between the base station and a terminal.

Alternatively or in addition to the aforementioned methods, an uplink signal transmitted from a terminal to the base station may be employed by the base station as quality measure characterizing the quality of signal transmission. Particularly, if equipped with a plurality of antenna elements such as e.g. in the case of a phase-controlled antenna system, the base station may analyze signals received in the uplink direction regarding their phase differences, e.g. in the sense of a per se known direction of arrival (DoA) estimation. I.e., from evaluating received uplink transmissions regarding the DoA parameter, the base station may conclude that a tilt angle that has been used for said uplink transmission is not yet optimal or has e.g. yielded at least some improvement over a previously set tilt angle. Thus, by analyzing the DoA parameter, a further degree of freedom is provided for the base station to accurately assess whether improvements may be achieved by further changing the tilt angle.

Generally, the adjustment of the tilt angle may be performed in different ways. Firstly, if the base station's antenna is a phase-controlled antenna the beam pattern of which can be dynamically controlled by altering a phase of at least one signal supplied to an antenna element of said antenna (which is usually done by a corresponding antenna controller), an adjustment of the tilt angle may possibly be achieved by correspondingly controlling the beam pattern. I.e., the antenna may be electrically controlled so as to alter the tilt angle between an axis of a main lobe of said beam pattern and a horizontal plane.

Secondly, if the base station's antenna is not a phase-controlled antenna but rather a conventional antenna without the possibility of electrically controlling the beam pattern, and especially the tilt angle of the main lobe axis, a tilt angle adjustment in the sense of the embodiments may be accomplished by mechanical driving means which rotate the antenna around a predetermined axis such as e.g. an axis in the horizontal plane which extends substantially perpendicularly to the direction of propagation defined by the main lobe of the beam pattern. Of course, a combination of the aforementioned methods may also be employed for tilt angle adjustment.

According to a preferred embodiment, the method of operating a base station comprises the following steps:
- adjusting the tilt angle by increasing or decreasing it by a predetermined amount,
- determining a value of said quality measure after said adjustment, and
- evaluating, whether said quality measure has increased.

If the quality measure has already increased substantially after a first step of adjusting, the process may end. The increase or decrease of the quality measure may be determined by comparing the value of said quality measure obtained after said adjustment with a corresponding value that has been obtained prior to adjusting.

According to an embodiment, it is proposed that said steps of adjusting, determining and evaluating are repeated for a predetermined maximum number of iterations or until a predetermined increase of said quality measure has been detected.

According to a further advantageous embodiment, the amount by which the tilt angle is increased or decreased in said step of adjusting is determined based on at least one of: operational parameters of said base station, a current number of iterations, the maximum number of iterations, a current value of said quality measure, a value of said quality measure obtained prior to a previous step of adjusting, a random event or a pseudo-random event.

Taking into consideration operational parameters of the base station such as
- a number of terminals/users currently served,
- an average signal to noise plus interference ratio, SINR, for some or all user connections currently served,
- a distribution of distances between the terminals which are currently served by the base station and the base station advantageously enables to precisely adapt the adjustment according to the embodiments to a specific operating scenario of the base station.

E.g., if a comparatively high number of terminals is served and if their distance distribution is rather flat, i.e. if there are many terminals at many different distances to the base station, it may be concluded that performing the adjustment of the tilt angle should be started with comparatively small changes to the tilt angle so as to avoid a sudden deterioration of SINR values associated with single terminals that are situated at the borders of the cell or sector served by the antenna considered for tilt angle adjustment.

However, if the distance distribution e.g. has a peak at intermediate distance values, which means that numerous terminals are located within a moderate distance to the base station, it may be concluded that performing the adjustment of the tilt angle may be started with comparatively large changes to the tilt angle since only a substantial alteration of the tilt angle will affect those numerous terminals.

Advantageously, it is also possible to alter the amount by which the tilt angle is changed during the step of adjusting from iteration to iteration so as to account for the quality measure converging to a desired value. I.e., the amount by which the tilt angle is changed may be reduced from a first iteration to a next iteration.

As a further example, the amount by which the tilt angle is changed during the step of adjusting may also be chosen depending on a difference of the SINR as obtained prior to the last step of adjusting and the SINR as obtained after the last step of adjusting.

Random events or pseudo-random events may also form a basis on which the amount by which the tilt angle is changed may be determined. For instance, true random events as detectable by the base station are the time of arrival of a new terminal or a duration of a data connection with a terminal, whereas pseudo-random events may be generated by processing means of the base station in a per se known manner. The consideration of random events or pseudo-random events may e.g. be useful for performing statistical optimization algorithms, which, according to a further embodiment, may also be employed to determine an optimum tilt angle according to a predetermined target function or fitness function, such as e.g. an average SINR of all terminals served by the considered antenna of the base station.

According to a further advantageous embodiment, said quality measure, e.g. the SINR, on which the adjustment of the tilt angle according to the embodiments depends, is determined based on feedback information received from at least one terminal which is served by the base station via said antenna. For instance, a terminal served by the base station may directly forward an SINR value it has determined for a downlink data transmission from the base station.

According to a further advantageous embodiment, the base station comprises a plurality of antennas, each of which serves a specific spatial sector, such as e.g. a sector of about 120°, and said step of adjusting is only performed for one antenna or an associated sector, respectively, at a time thus avoiding a simultaneous tuning of tilt angles for neighboring sectors.

According to a further advantageous embodiment, said step of adjusting is repeated according to at least one of: a predetermined schedule, operational parameters of said base station or of a neighboring base station, a random event. I.e., the adjustment process according to the embodiments, which itself may comprise various iterations, can be performed periodically, such as twice an hour or the like. It is also possible to perform the adjustment process according to the embodiments randomly or in such cases where a predetermined number of terminals served by the base station's antenna is exceeded. A base station may also consider operational parameters of a neighboring base station for the conduction of the adjustment process.

A further solution to the object of the present invention is given by a base station according to claim 9. The base station is configured to adjust a tilt angle of the antenna and/or of a beam pattern of said antenna depending on a quality measure which characterizes the quality of a signal transmission associated with said antenna.

Further advantageous embodiments of the invention are given in the dependent claims.

BRIEF DESCRIPTION OF THE FIGURES

Further features, aspects and advantages of the present invention are given in the following detailed description with reference to the drawings in which.

DESCRIPTION OF THE EMBODIMENTS

Figure 1:
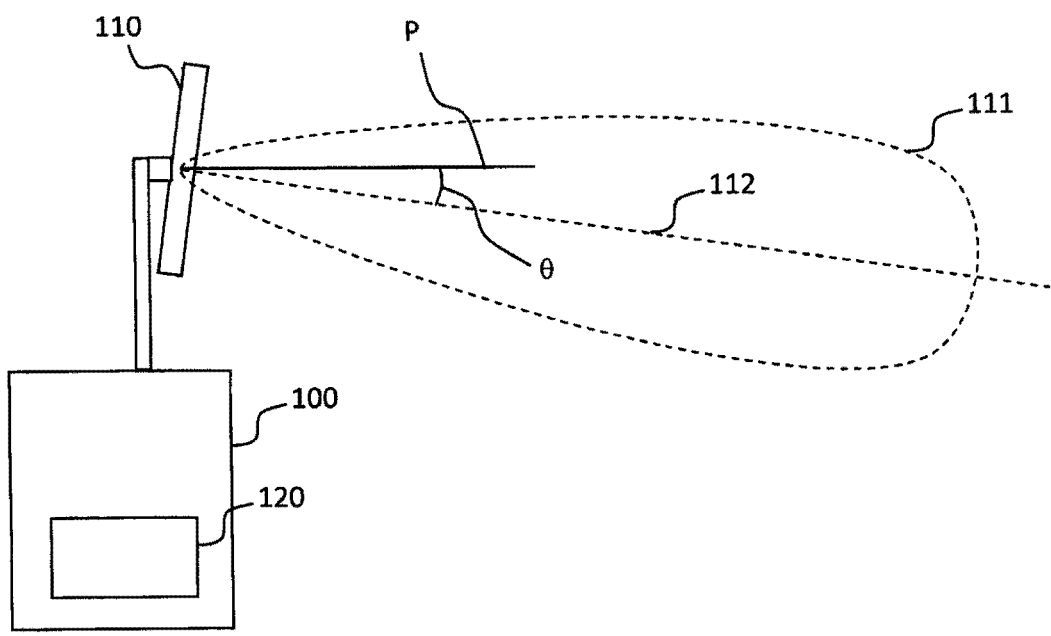
FIG. 1 depicts a simplified block diagram of a base station according to an embodiment.

FIG. 1 depicts a simplified block diagram of a base station 100 of a cellular communications network. The base station 100 may serve a number of terminals (not shown) such as mobile user terminals by maintaining respective data communication sessions in a per se known manner. For instance, the base station 100 may operate according to at least one of the following standards: GSM (Global System for Mobile Communications), UMTS (Universal Mobile Telecommunications System), LTE (Long Term Evolution), WiMax (Worldwide Interoperability for Microwave Access), WLAN (Wireless Local Area Network).

The base station 100 comprises an antenna 110, a characteristic beam pattern of which is symbolized by the dashed shape 111. According to an embodiment, the antenna 110 may be electrically controlled to reconfigure its beam pattern 111 or at least a direction of the main lobe of beam pattern 111 in which the main lobe's axis 112 extends.

I.e., the tilt angle θ of the antenna 110, more precisely of its main lobe 112, which—as can be gathered from FIG. 1—is defined as the angle between the main lobe's axis 112 and a virtual plane P that is parallel to ground, can be electrically controlled. This is e.g. accomplished by the processing means 120 which also control the basic operation of the base station 100. Moreover, the processing means 120 are also configured to perform the method according to the embodiments explained below with reference to FIGS. 2 and 3.

According to a further embodiment, the base station 100 may comprise an antenna 110 a beam pattern of which cannot be controlled electronically. In this case, the tilt angle θ is influenced by rotating the antenna 110 around an axis which is e.g. perpendicular to the drawing plane of FIG. 1. For this purpose, an electromechanical actuator can be provided in the support of the antenna 110, wherein said actuator is also controlled by the processing means 120 of the base station 100. A combination of an electrically controllable antenna 110 (regarding tilt angle θ) with a mechanical drive is also possible.

In contrast to conventional base stations, the antennas of which are mounted with a predetermined and fixed tilt angle θ during an installation of the base station, the base station 100 according to an embodiment is configured to adjust the tilt angle θ of the antenna 110 and/or of its beam pattern 111, respectively, depending on a quality measure which characterizes the quality of a signal transmission associated with said antenna 110.

Particularly, according to an embodiment, the tilt angle adjustment is performed dynamically, i.e. without interrupting an ongoing data transmission via the antenna 110 the tilt angle θ of which is adjusted.

Thus, base station 100 can dynamically adapt a radio coverage area defined by the beam pattern 111 to ongoing communications processes with the terminals (not shown) that are being served by the base station 100. This way, a quality of data transmission between the base station 100 and its terminals may potentially be improved.

According to a preferred embodiment, a signal to noise plus interference ratio, SINR, is used by the base station 100 as a quality measure to assess the quality of a signal transmission. Of course, other suitable parameters such as a bit error rate, BER, or CQI (channel quality indicator) reports as known from LTE systems may also be used to characterize the quality of a signal transmission between the base station 100 and a terminal.

For instance, the base station 100 may, preferably periodically, receive feedback information from a connected mobile terminal, said feedback information representing an SINR value as determined by the terminal for a process of receiving data from said base station 100. Based on this feedback information, the processing means 120 of the base station 100 may assess the quality of signal transmission in a downlink direction to the terminal(s).

Figure 2:
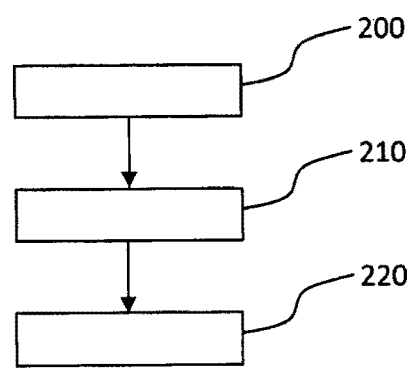
FIG. 2 depicts a simplified flow-chart of a method of operating a base station according to an embodiment.

The flow-chart of FIG. 2 depicts a preferred embodiment of a method of operating the base station 100. In a first step 200, the tilt angle θ is adjusted by a predetermined amount starting from an initial tilt angle value that may e.g. be defined by the processing means 120 upon initialization of the base station 100.

After adjusting the tilt angle θ in step 200, base station 100, more precisely the processing means 120, in step 210 determine a SINR value as a quality measure characterizing downlink transmission quality at least for a downlink channel with a specific terminal. It is also possible to determine the SINR or another suitable quality measure representing downlink transmission quality to a plurality of terminals or to determine an average quality measure such as an average SINR for a plurality of terminals currently served by the base station 100.

In step 220, the processing means 120 of the base station 100 evaluate whether said quality measure, which has been obtained in preceding step 210, has increased. The increase or a decrease of the quality measure may be determined by comparing the value of said quality measure obtained after said adjustment 200, i.e. during step 210, with a corresponding quality measure value that has been obtained prior to adjusting 200.

This way, the base station 100 may precisely assess whether the adjustment of the tilt angle θ performed in step 200 yielded an improvement regarding signal transmission quality.

If not, i.e. if the SINR obtained after adjusting 200 has not increased with respect to the old tilt angle that was set prior to adjusting 200, the steps 200, 210, 220 may be repeated for a predetermined number of iterations. In the course of these iterations, it is also possible to modify the amount by which the tilt angle θ is adjusted within step 200, as well as the direction of adjustment, i.e. whether the current tilt angle θ is increased or whether it is decreased by said amount within step 200.

According to an embodiment, starting from its initial value, the tilt angle θ may e.g. be altered by 2% of its overall setting range per step of adjusting. Any other adjustment steps that can be implemented by the given adjustment mechanism (electrical beam forming or mechanically driving the antenna 110) may also be applied.

Preferably, the iterative execution of steps 200, 210, 220 is terminated if a predetermined maximum number of iterations is reached. Alternatively, the iterations may also be terminated if, by means of the evaluation in step 220, it is concluded that a significant improvement regarding SINR has been achieved.

Of course, according to a further particularly preferred embodiment, the steps 200, 210, 220 may be repeated continuously, i.e. without terminating after a specific number of iterations. This variant advantageously accounts for the usually highly dynamic structure of a cellular communications network with many terminals roaming around. By continuously repeating the method according to the embodiments, it is ensured that the base station always tries to set an optimum tilt angle for the terminals currently served, i.e. a continuous improvement and adaptation of tilt angle is enabled.

Figure 3:
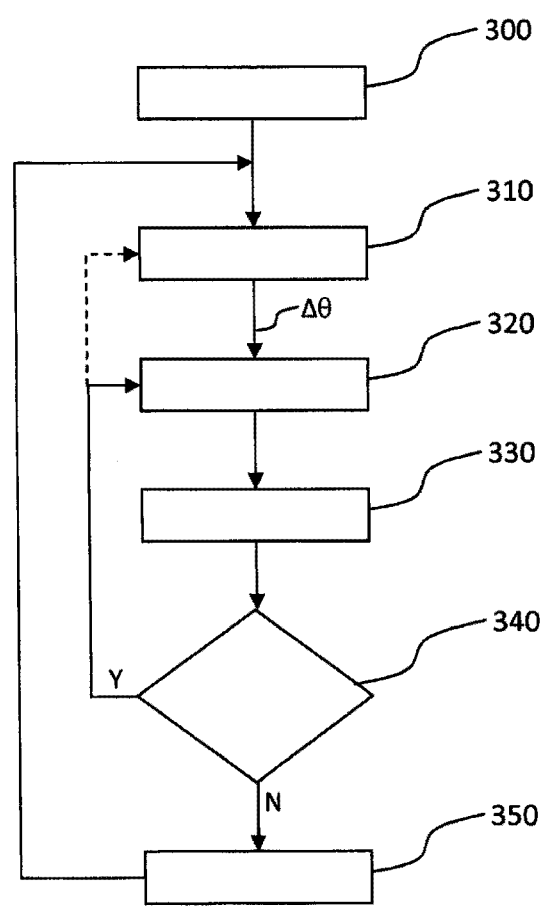
FIG. 3 depicts a simplified flow-chart of a method of operating a base station according to a further embodiment.

FIG. 3 depicts a flow-chart of a further embodiment of a method of operating the base station 100 (FIG. 1).

In a first step 300, a current value of the SINR as determined for a downlink connection to a specific terminal is obtained by processing means 120 which evaluate corresponding feedback information received at the base station 100 from its terminals. Alternatively or in addition, an average SINR value may also be considered which e.g. represents a downlink transmission quality averaged over a plurality of terminals.

In step 310, the processing means 120 determine, by which amount Δθ the current tilt angle θ of the antenna 110 is to be adjusted. Additionally, in step 310, the direction of adjustment of the current tilt angle θ may also be determined, i.e. whether to increase or decrease the current tilt angle θ by the amount Δθ.

According to a further advantageous embodiment, the amount Δθ by which the tilt angle is increased or decreased in the following step of adjusting 320 is determined based on at least one of: operational parameters of said base station 100, a current number of iterations, the maximum number of iterations, a current value of said quality measure, a value of said quality measure obtained prior to a previous step of adjusting, a random event or a pseudo-random event.

Taking into consideration operational parameters of the base station 100 such as a number of terminals/users currently served, an average signal to noise plus interference ratio, SINR, for some or all user connections/terminals currently served, a distribution of distances between the terminals which are currently served by the base station and the base station advantageously enables to precisely adapt the adjustment 320 to a specific operating scenario of the base station 100.

E.g., if a comparatively high number of terminals is served and if the their distance distribution is rather flat, i.e. if there are many terminals at many different distances to the base station 100, it may be concluded that performing the adjustment of the tilt angle θ should be started with comparatively small changes Δθ to the tilt angle θ so as to avoid a sudden deterioration of SINR values associated with single terminals that are situated at the borders of the cell or sector served by the antenna 110 considered for tilt angle adjustment.

However, if the distance distribution e.g. has a peak at intermediate distance values, which means that numerous terminals are located within a moderate distance to the base station 100, it may be concluded that performing the adjustment of the tilt angle θ may be started with comparatively large changes Δθ to the tilt angle θ since only a substantial alteration of the tilt angle θ might affect those numerous terminals, i.e. lead to SINR improvement.

Advantageously, it is also possible to alter the amount Δθ by which the tilt angle θ is changed during the step of adjusting 320 from iteration to iteration so as to account for the quality measure converging to a desired value. I.e., the amount Δθ by which the tilt angle θ is changed may be reduced from a first iteration to a next iteration.

As a further example, the amount Δθ by which the tilt angle θ is changed during the step of adjusting 320 may also be chosen depending on a difference of the SINR as obtained prior to the last step of adjusting 320 and the SINR as obtained after the last step of adjusting 320.

Random events or pseudo-random events may also form a basis on which the amount Δθ by which the tilt angle θ is changed may be determined. For instance, true random events as detectable by the base station 100 are the time of arrival of a new terminal or a duration of a data connection with a terminal, whereas pseudo-random events may be generated by its processing means 120 in a per se known manner. The consideration of random events or pseudo-random events may e.g. be useful for performing statistical optimization algorithms, which, according to a further embodiment, may also be employed to determine an optimum tilt angle according to a predetermined target function or fitness function, such as e.g. an average SINR of all terminals served by the considered antenna 110 of the base station 100.

After the step 310 of determining the amount Δθ by which the tilt angle θ is to be adjusted, this adjustment is applied in subsequent step 320 by the processing means 120 effecting a respective control of the antenna's beam pattern or a mechanical drive, respectively.

In step 330, the current SINR, i.e. as obtained as a result of the adjustment of step 320, is determined and compared with the old SINR value as obtained in step 300 prior to the adjustment, cf. step 340. If the evaluation of step 340 yields that the current SINR exceeds the old SINR, the process branches to step 320 for a further adjustment of the tilt angle θ in the same direction. Alternatively, if it is desired to alter the specific amount Δθ by which the tilt angle θ is to be adjusted in future, the process may also branch to step 310 instead of step 320, whereby a new determination of the adjustment parameter Δθ is enabled, cf. the dashed arrow from block 340 to block 310.

However, if the evaluation of step 340 yields that the current SINR is less or equal than the old SINR, the process branches to step 350, wherein the adjustment strategy is reviewed. For instance, in step 350, the direction of adjustment, i.e. the sign of the adjustment parameter Δθ may be changed. After that, the process may continue with step 310 to determine an absolute value of the adjustment parameter Δθ. After that, in step 320, a further adjustment of the tilt angle θ is effected.

Depending on the specific optimization strategy for the tilt angle θ, of course, it is possible to perform further changes to the adjustment parameter Δθ within step 350. It is also possible to dynamically change the optimization strategy within step 350, e.g. to account for a change in the operating conditions of base station 100 or the like.

According to a further embodiment, the adjustment processes as exemplarily explained above with respect to FIGS. 2 and 3 above may also be repeated according to a predetermined schedule stored to the processing means 120 or defined by a central office of the network the base station 100 belongs to.

The application of the adjustment processes as exemplarily explained above with respect to FIGS. 2 and 3 above may also be triggered by operating parameters of the base station 100.

I.e., whenever a number of concurrently served terminals exceeds or falls below a predetermined threshold, the base station 100 may perform steps 200 to 220 or steps 300 to 350 or a combination thereof.

It is also possible for the base station 100 to perform the adjustment processes as exemplarily explained above with respect to FIGS. 2 and 3 depending on operational parameters of a neighbouring base station, i.e. a load of said neighbouring base station and the like.

According to a particularly preferred embodiment, wherein an average SINR of a plurality of terminals is used as a quality measure for steps 220, 340, the adjustment processes as exemplarily explained above with respect to FIGS. 2 and 3 are only conducted if base station 100 has collected a significant amount of SINR data from the considered terminals so as to be able to precisely judge whether an adjustment of the tilt angle results in an improvement of transmission quality.

The inventive principle of tilt angle adjustment can also be extended to base stations 100 that comprise more than one antenna 110, wherein each of the plurality of antennas serves a different spatial sector with its radio coverage. In these embodiments, said step of adjusting 200 and the following steps 210, 220 are preferably only performed for one antenna 110 or an associated sector, respectively, at a time.

The embodiments explained above are not limited to base stations 100 of cellular communications networks. The inventive principle of tilt angle adjustment may rather be applied to any base station having at least one antenna a tilt angle of which (or a tilt angle of a main lobe 111 of a corresponding beam pattern) may be controlled, e.g. electrically or on an electromechanical basis. Typically, the principle may be applied with GSM-, UMTS-, LTE-, and WiMAX-base stations.

Advantageously, the application of the inventive principle reduces an effort required for network planning and increases network robustness. Moreover, since the base station 100 or its processing means 120 can apply the inventive principle, a decentralized adaptation of the radio access network to changing environments and operating conditions is enabled.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the Figures, including any functional blocks labelled as 'processors', may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term 'processor' or 'controller' should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

The invention claimed is:

1. A method of operating a base station for a cellular communications network, wherein said base station comprises at least one antenna, said method comprising adjusting a tilt angle of the antenna and/or of a beam pattern of said antenna, wherein said adjusting is performed depending on a quality measure which characterizes the quality of a signal transmission associated with said antenna, the method further comprising:
   adjusting the tilt angle by increasing or decreasing the tilt angle by an amount;
   determining a value of said quality measure after said adjustment;
   evaluating whether said quality measure has increased,
   wherein said adjusting, determining, and evaluating are repeated if the adjustment of the tilt angle performed did not yield an improvement regarding the quality measure.

2. The method according to claim 1, wherein:
   the amount by which the tilt angle is increased or decreased in said adjusting is determined based on at least one of: a current number of iterations, a maximum number of iterations, a value of said quality measure obtained prior to a previous adjusting, a random event or a pseudo-random event.

3. The method according to claim 1, wherein said adjusting, determining and evaluating are repeated for a predetermined maximum number of iterations or until a predetermined increase of said quality measure has been detected.

4. The method according to claim 1, wherein said quality measure is determined based on feedback information received from at least one terminal which is served by said base station via said antenna.

5. The method according to claim 1, wherein said base station comprises a plurality of antennas serving specific sectors, and wherein said adjusting is performed for one antenna or an associated sector, respectively, at a time.

6. The method according to claim 1, wherein said adjusting is repeated according to at least one of: a predetermined schedule, operational parameters of said base station or of a neighbouring base station, a random event.

7. The method according to claim 1, wherein said adjusting is performed dynamically without interrupting an ongoing data transmission via said antenna.

8. A base station for a cellular communications network, wherein said base station comprises at least one antenna, and wherein the base station is configured to adjust a tilt angle of the antenna and/or of a beam pattern of said antenna depending on a quality measure which characterizes the quality of a signal transmission associated with said antenna, wherein said base station is configured to:
   adjust the tilt angle by increasing or decreasing the title angle by an amount,
   determine a value of said quality measure after said adjustment,
   evaluate whether said quality measure has increased,
   wherein the adjusting, determining, and evaluating are repeated if the adjustment of the tilt angle performed did not yield an improvement regarding the quality measure.

9. The base station according to claim 8, wherein said base station is configured to
   adjust the tilt angle by increasing or decreasing the title angle by a predetermined amount,
   determine a value of said quality measure after said adjustment,
   evaluate whether said quality measure has increased.

10. The base station according to claim 9, wherein said base station is configured to repeat said adjusting, determining and evaluating for a predetermined maximum number of iterations or until a predetermined increase of said quality measure has been detected.

11. The base station according to claim 8, wherein said base station is configured to determine said quality measure based on feedback information received from at least one terminal which is served by said base station via said antenna.

12. The base station according to claim 8, wherein said base station comprises a plurality of antennas which serve specific sectors, wherein said base station is configured to perform said adjusting for one antenna or an associated sector, respectively, at a time.

13. The base station according to claim 8, wherein said base station is configured to perform said adjusting without interrupting an ongoing data transmission via said antenna.

14. The base station according to claim 8, wherein said base station is configured to determine the amount by which the tilt angle is increased or decreased in said adjusting based on at least one of: a current number of iterations, a maximum number of iterations, a value of said quality measure obtained prior to a previous adjusting, a random event or a pseudo-random event.

* * * * *